United States Patent
Lai et al.

(10) Patent No.: US 12,315,977 B2
(45) Date of Patent: May 27, 2025

(54) SHOCK-FORCE MITIGATION SYSTEMS AND METHODS FOR ELECTROCHEMICAL FUEL CELL STACKS

(71) Applicant: GM GLOBAL TECHNOLOGY OPERATIONS LLC, Detroit, MI (US)

(72) Inventors: Yeh-Hung Lai, Oakland, MI (US); Jeffrey A. Rock, Rochester Hills, MI (US); Balasubramanian Lakshmanan, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 826 days.

(21) Appl. No.: 17/515,893

(22) Filed: Nov. 1, 2021

(65) Prior Publication Data

US 2023/0138029 A1    May 4, 2023

(51) Int. Cl.
| | |
|---|---|
| H01M 8/248 | (2016.01) |
| B60K 1/04 | (2019.01) |
| H01M 8/04082 | (2016.01) |
| H01M 8/04664 | (2016.01) |
| H01M 8/04746 | (2016.01) |
| H01M 8/2404 | (2016.01) |
| H01M 8/2475 | (2016.01) |

(52) U.S. Cl.
CPC ............ *H01M 8/248* (2013.01); *B60K 1/04* (2013.01); *H01M 8/04201* (2013.01); *H01M 8/04679* (2013.01); *H01M 8/04753* (2013.01); *H01M 8/2404* (2016.02); *H01M 8/2475* (2013.01); *H01M 2250/20* (2013.01)

(58) Field of Classification Search
CPC ..... H01M 8/2465; H01M 8/247; H01M 8/248
See application file for complete search history.

(56) References Cited

U.S. PATENT DOCUMENTS

| | | |
|---|---|---|
| 3,455,743 A | 7/1969 | Huebscher et al. |
| 5,478,662 A | 12/1995 | Strasser |
| 6,602,624 B1 | 8/2003 | Doan et al. |
| 6,835,477 B1 | 12/2004 | Brambilla et al. |
| 6,841,292 B2 | 1/2005 | Nelson et al. |
| 6,866,955 B2 | 3/2005 | Lee et al. |
| 7,160,341 B2 | 1/2007 | Sinha et al. |
| 7,264,895 B2 | 9/2007 | White |
| 7,759,010 B2 | 7/2010 | Hoch |
| 7,955,743 B2 | 6/2011 | Ganapathy et al. |

(Continued)

*Primary Examiner* — Nathanael T Zemui
(74) *Attorney, Agent, or Firm* — Quinn IP Law

(57) ABSTRACT

Presented are shock-force mitigation systems for fuel cell stacks, methods for making/using such systems, and electric-drive vehicles equipped with such systems. A fuel cell system includes multiple electrochemical fuel cells that are stacked face-to-face along a stack axis to define a fuel cell stack. A push plate abuts each longitudinal end of the fuel cell stack; these push plates translate rectilinearly along the stack axis inside a fuel cell stack housing. An end plate is located in facing spaced relation to each push plate to define a plate pair at each end of the stack. An active or passive force-modifying device is interposed between the two plates in each plate pair; these devices modify stack forces experienced by the fuel cell stack. For an active shock-force mitigation system, each force-modifying device may include a bladder system, spring, and/or linear actuator; an electronic system controller controls activation of the bladders/actuators.

20 Claims, 4 Drawing Sheets

(56) References Cited

U.S. PATENT DOCUMENTS

| | | |
|---|---|---|
| 8,313,871 B2 | 11/2012 | Wexel et al. |
| 8,371,587 B2 | 2/2013 | Fly et al. |
| 8,524,412 B2 | 9/2013 | Rock et al. |
| 8,535,845 B2 | 9/2013 | Rock et al. |
| 8,580,454 B2 | 11/2013 | Fly et al. |
| 8,603,654 B2 | 12/2013 | Cartwright et al. |
| 9,997,811 B2 | 6/2018 | Champagne et al. |
| 10,038,173 B2 | 7/2018 | Curtis et al. |
| 10,403,945 B2 | 9/2019 | Champagne et al. |
| 10,601,063 B2 | 3/2020 | Rock et al. |
| 2004/0058224 A1 | 3/2004 | Eshraghi et al. |
| 2008/0050640 A1 | 2/2008 | Sun et al. |
| 2011/0039190 A1 | 2/2011 | Owejan et al. |
| 2011/0159389 A1* | 6/2011 | Ohara .................. G05B 13/02 429/429 |
| 2011/0207012 A1 | 8/2011 | Frost et al. |
| 2014/0335432 A1 | 11/2014 | Sinha et al. |
| 2015/0180079 A1 | 6/2015 | Leger et al. |
| 2016/0204401 A1 | 7/2016 | Curtis et al. |
| 2017/0058420 A1 | 3/2017 | Goulet et al. |
| 2017/0288254 A1* | 10/2017 | Strahl ................. H01M 8/2404 |
| 2017/0317365 A1* | 11/2017 | Strahl .................. H01M 8/045 |
| 2019/0252705 A1 | 8/2019 | Mathias et al. |

\* cited by examiner

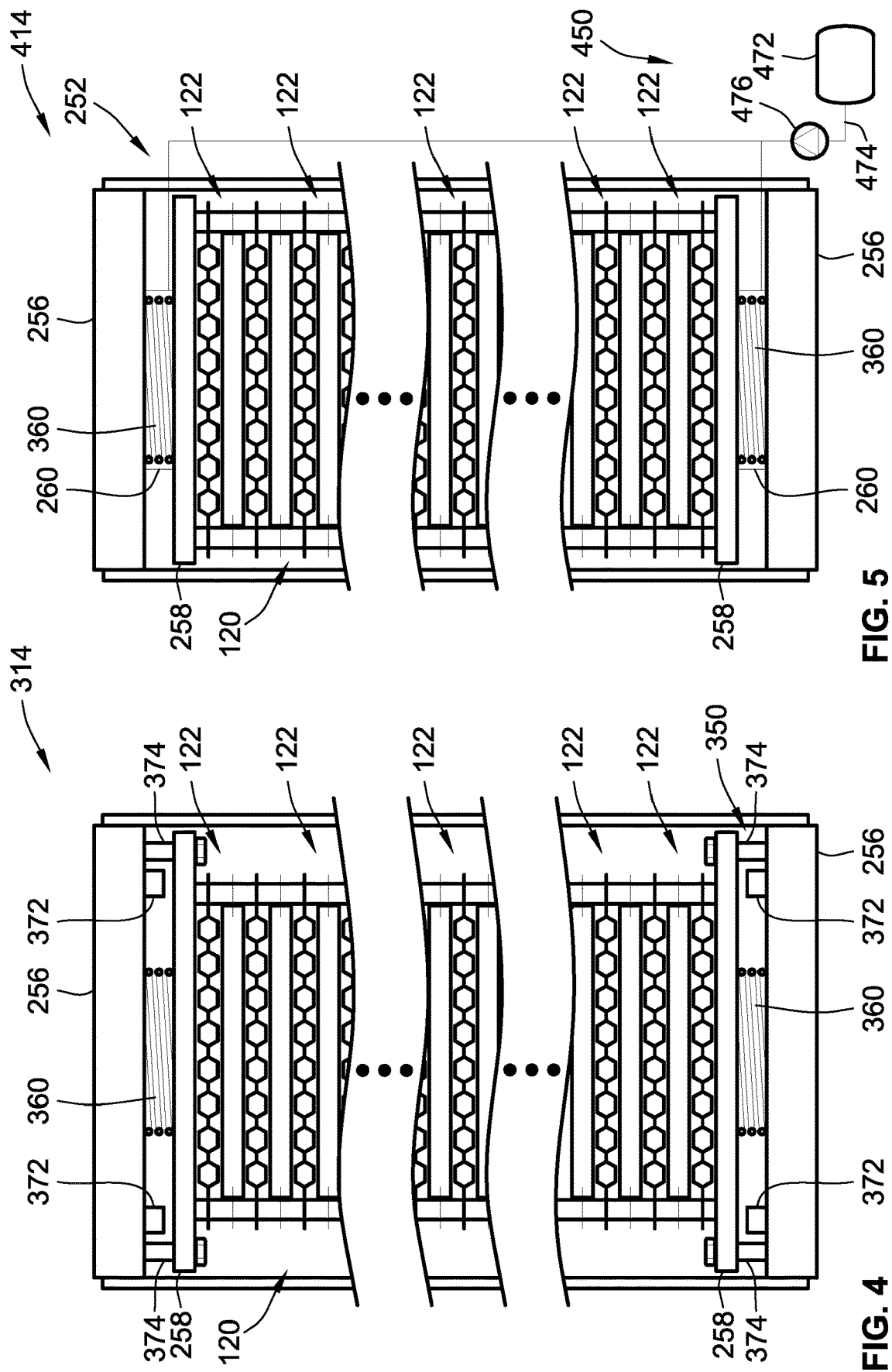

SHOCK-FORCE MITIGATION SYSTEMS AND METHODS FOR ELECTROCHEMICAL FUEL CELL STACKS

INTRODUCTION

The present disclosure relates generally to electrochemical fuel cell systems for converting hydrogen-rich fuels into electricity. More specifically, aspects of this disclosure relate to active and passive systems for mitigating shock forces in fuel cell stacks.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Fuel cells are electrochemical devices that convert a hydrogen-rich fuel, such as liquid hydrogen or methanol, and an oxidant, such as air or concentrated oxygen, to produce electricity through a redox reaction. To generate the requisite electricity for powering a motor vehicle, numerous fuel cells are combined, in series or in parallel, into a fuel cell stack in order to achieve a higher output voltage and allow for stronger current draw. For example, a typical automotive fuel cell stack may have in excess of two hundred cells. These fuel cell stacks receive reactant gas as a cathode input, typically as a metered flow of ambient air forced through the stack by a compressor. During normal operation, a quantifiable mass of the oxygen is not consumed by the stack; some of the remnant oxygen is output as cathode waste gas that may include water as a stack by-product. The fuel cell stack also receives hydrogen or hydrogen-rich reactant gas as an anode input that flows into the anode side of the stack. The distribution of hydrogen within the anode flow channels is typically held substantially constant for proper fuel cell stack operation.

Fuel cell designs commonly employed in automotive applications utilize a solid polymer electrolyte membrane (PEM)—also referred to as a "proton exchange membrane"—to provide ion transport between the anode and cathode. Proton exchange membrane fuel cells (PEMFC) employ a solid polymer electrolyte (SPE) proton-conducting membrane, such as a perfluorosulfonic acid membrane, to separate product gases and provide electrical insulation of electrodes in addition to conduction of protons. The anode and cathode may include finely dispersed catalytic particles, such as platinum, supported on carbon particles and mixed with an ionomer. This catalytic mixture is deposited on the sides of the membrane to form the anode and cathode layers. The combination of the anode layer, cathode layer, and electrolyte membrane define a membrane electrode assembly (MEA) in which the anode catalyst and cathode catalyst are supported on opposite faces of the ion conductive solid polymer membrane. The MEA is sandwiched between anode-side and cathode-side diffusion media (DM) that are formed from a conductive and gas-permeable material, such as carbon fabric or paper. The DM layers and MEA are pressed between electronically conductive monopolar or bipolar flow field plates that serve as secondary current collectors for collecting current from the DMs, which serve as primary current collectors. In order to mitigate against undesirable leakage of fluids from between the plates, a polymeric or raised-bead seal may be disposed along an interface of the plates.

SUMMARY

Presented herein are shock-force mitigation systems for electrochemical fuel cell stacks, methods for making and methods for operating such systems, and electric-drive vehicles with fuel cell stacks having shock-force attenuating capabilities. By way of example, an active shock-force mitigation system and method employs a real-time clock (RTC) that collaborates with a system control module to monitor a stack life of a fuel cell stack. Using this stack life data, the system controller estimates a degree of fuel cell stack aging using a memory-stored lookup table that contains a predetermined relationship between stack lifetime and seal creep. A system sensor, such as a load cell, trilateral accelerometer, or linear force transducer, detects the onset of a mechanical shock to the fuel cell stack, which may result from a vehicle collision, collision with a pothole or curb, etc. The system control module forecasts the severity of the mechanical system shock—magnitude of a resultant internal stack force—and assesses whether or not a fuel cell in the stack will reach a maximum seal force limit or a minimum seal force threshold. If so, the system control module activates a pair of bladders or actuators packed at opposing ends of the stack to: (a) reduce the stack compression force by a pre-determined amount for a pre-determined duration if the fuel cell stack is determined to be at an early stage of aging; or (b) increase the stack compression force by a pre-determined amount for a pre-determined duration if the fuel cell stack is determined to be at a later stage of aging.

In addition to active shock attenuation, passive shock-force mitigation systems are also presented for electrochemical fuel cell stacks. In an example, a push plate and an end plate are located at each longitudinal end of the fuel cell stack, with the push plates located inboard of the end plates and sandwiching therebetween the stacked fuel cells. A biasing member, such as a helical compression spring or a pneumatic cylinder, is interposed between each neighboring push-and-end plate pair. Upon occurrence of mechanical system shock, the push plates travel towards their respective end plate; the biasing member acts to absorb and modify the resultant shock. During the mechanical system shock, the push plate on the leading side travels towards its end plate; the biasing member may allow the stack to slightly decompress and, thus, avoid damage from the resultant shock. To limit push plate travel length, one or more travel blocks may be located between each push plate and end plate. Moreover, a shoulder screw may pass through the push plate and threadably mate with the end plate to restrict push plate travel to one direction. To further mitigate internal stack forces, the fuel cell system may inject a surge of fluid pressure (e.g., 80-100 kilopascals (kPa) in under 15 milliseconds (ms)) into the stacked fuel cells at the onset of the shock event.

Aspects of this disclosure are directed to shock-force mitigation systems for electrochemical fuel cell stacks, such as those employed in a fuel cell electric vehicle (FCEV). In an example, a fuel cell system includes multiple electrochemical fuel cells, such as PEM-type fuel cells, that are stacked face-to-face along a stack axis to define a fuel cell stack with opposing longitudinal ends (e.g., top and bottom axial ends of a vertical stack). The fuel cell stack may be housed inside a protective outer casing and fluidly coupled to a refillable hydrogen fuel tank and an ambient air compressor. A pair of push plates abuts the longitudinal ends of the fuel cell stack, sandwiching therebetween the fuel cells. Each push plate is movably mounted inside the protective casing to translate rectilinearly along the stack axis. A fixedly mounted end plate is located in facing spaced relation to each push plate such that the end plates and push plates are arranged in discrete plate pairs. Interposed between the push and end plates in each pair is a respective force-modifying device. These force-modifying devices modify stack forces imparted to the fuel cell stack, e.g., as a result of a shock event.

Additional aspects of this disclosure are directed to FCEVs equipped with high-voltage (HV) fuel cell systems having shock-force attenuating capabilities. As used herein, the terms "vehicle" and "motor vehicle" may be used interchangeably and synonymously to include any relevant vehicle platform, such as passenger vehicles (e.g., hybrid electric, full electric, fully and partially autonomous, etc.), commercial vehicles, industrial vehicles, tracked vehicles, motorcycles, off-road and all-terrain vehicles (ATV), watercraft, aircraft, etc. For non-automotive applications, disclosed concepts may be implemented for all logically relevant uses, including stand-alone power stations, portable power packs, backup generator systems, pumping equipment, residential use, electric vehicle charging stations (EVCS), etc. In an example, an electric-drive vehicle includes a vehicle body with a passenger compartment, multiple road wheels mounted to the vehicle body (e.g., via corner modules coupled to a unibody or body-on-frame chassis), and other standard original equipment. One or more electric traction motors operate alone (e.g., for FEV powertrains), or in conjunction with an engine assembly (e.g., for HEV powertrains) to selectively drive one or more of the road wheels to propel the vehicle. A rechargeable traction battery pack may optionally be mounted onto the vehicle body and operable to store electric power for the traction motor(s).

Continuing with the discussion of the preceding example, the electric-drive vehicle also includes a fuel cell system that is mounted onto the vehicle body and selectively operable to generate electricity for powering the traction motor(s), vehicle accessories, etc. The fuel cell system contains at least one fuel cell stack with multiple electrochemical fuel cells that are stacked face-to-face along a central stack axis. A pair of push plates presses against the longitudinal ends of the fuel cell stack; these push plates are movable along the stack axis. A pair of end plates is located in facing spaced relation to the push plates such that each neighboring set of push and end plates defines a discrete plate pair. A passive or active force-modifying device is interposed between the push and end plates in each plate pair. These devices selectively increase/decrease stack forces imparted to the fuel cell stack, e.g., depending upon stack aging and stack force intensity.

Aspects of this disclosure are also directed to system control logic, processor-executable control programs, and computer-readable media (CRM) for manufacturing and/or operating a shock-force mitigation system for an electrochemical fuel cell stack. In an example, a method is presented for assembling a fuel cell system. This representative method includes, in any order and in any combination with any of the above and below disclosed options and features: stacking a plurality of electrochemical fuel cells face-to-face along a stack axis to define a fuel cell stack with opposing first and second longitudinal ends; abutting first and second push plates against the first and second longitudinal ends, respectively, of the fuel cell stack, such that the first and second push plates are movable along the stack axis; locating first and second end plates in facing spaced relation to the first and second push plates, respectively, such that the first push plate and the first end plate define a first plate pair and the second push plate and the second end plate define a second plate pair; and interposing a first force-modifying device between the first plate pair and a second force-modifying device between the second plate pair, the first and second force-modifying devices being configured to increase and/or decrease a stack force imparted to the fuel cell stack.

For any of the disclosed systems, vehicles, and methods, each force-modifying device may include a bladder system or a linear actuator. In this instance, the fuel cell system employs a resident or remote system controller that communicatively connects to and is programmed to control the bladder systems/linear actuators. The fuel cell system may employ a shock sensor to detect the onset of a shock event that applies a shock force to the fuel cell stack. The shock sensor outputs one or more sensor signals indicative of the shock event onset to the system controller. As yet a further option, an electronic real-time clock monitors the stack life of the fuel cell stack and outputs one or more clock signals indicative thereof to the system controller. One or more resident or remote memory devices may store a lookup table with stack aging data that associates each of multiple fuel cell stack lives with a respective one of multiple seal creep levels.

For any of the disclosed systems, vehicles, and methods, the system controller may be programmed to: receive, from the shock sensor, a sensor signal indicating onset of a shock event; responsive to detection of the shock event, estimate a degree of fuel cell stack aging using the monitored stack life and stack aging data; determine if a severity of the stack force resulting from the shock event reaches a predefined threshold; and, if so, responsively transmit one or more command signals to the bladder systems/linear actuators to modify the applied stack force based on the estimated degree of fuel cell stack aging. These command signal(s) may cause the bladder systems/linear actuators to either: decrease the stack force by a first predetermined amount for a first predetermined duration if the degree of fuel cell stack aging is less than a predefined early-stage threshold; and increase the stack force by a second predetermined amount for a second predetermined duration if the degree of fuel cell stack aging is greater than a predefined late-stage threshold. These predetermined amounts and durations may vary depending on the monitored stack life and the severity of the stack force resulting from the shock event.

For any of the disclosed systems, vehicles, and methods, each force-modifying device may include a biasing member that is compressed between a respective pair of end and push plates. In this instance, the fuel cell system may include a fluid source, such as the hydrogen-based fuel container and/or oxidant compressor, that is fluidly connected to the fuel cell stack. A fluid injection device controls injection of fluid from the fluid source into the fuel cell stack. The system controller may be operable to command injection of the gas into the fuel cell stack at a predefined pressure for a predefined deploy time in response to detection of a shock event that causes application of a stack force to the fuel cell stack.

For any of the disclosed systems, vehicles, and methods, the fuel cell system may package one or more travel limit blocks between each pair of push and end plates. These travel limit blocks limit the length of travel of the push plates along the stack axis under the stack force applied to the stack. As yet a further option, one or more travel limit shoulders, such as a shoulder screw or a wall protrusion, is disposed between each push plate and the fuel cell stack. These travel limit shoulders limit the travel direction of the push plates along the stack axis.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features described above and below.

BRIEF DESCRIPTION OF THE DRAWINGS

FIG. 4 is a partially schematic, side-view illustration of a representative fuel cell system with a stack of electrochemical fuel cells and a representative active/passive shock-force mitigation system in accord with aspects of the disclosed concepts.

FIG. 5 is a partially schematic, side-view illustration of a representative fuel cell system with a stack of electrochemical fuel cells and a representative passive shock-force mitigation system in accord with aspects of the disclosed concepts.

Figure 1:
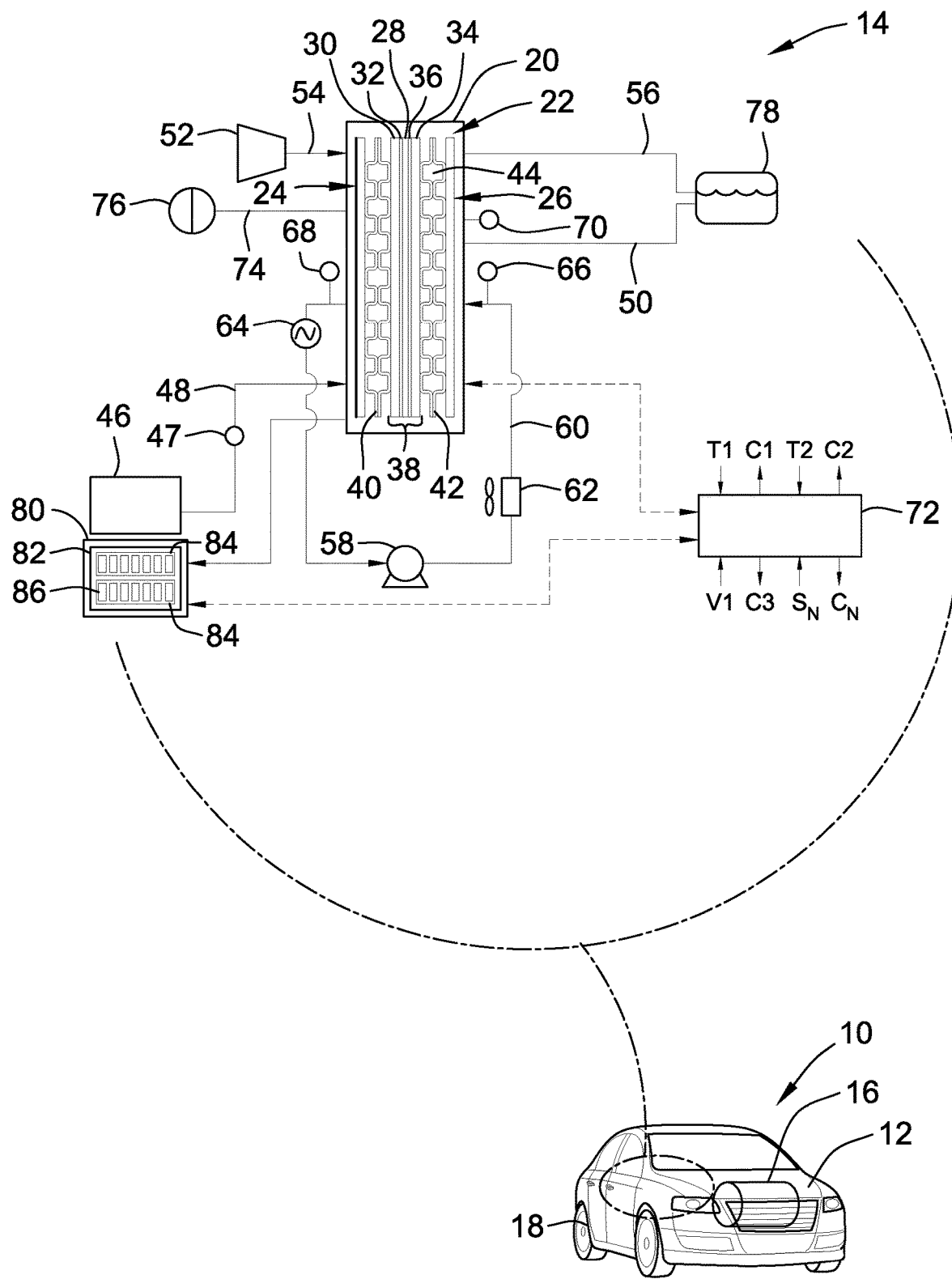
FIG. 1 is an elevated, perspective-view illustration of a representative motor vehicle with an inset schematic illustration of an example of a fuel cell system with shock-force mitigation capabilities in accord with aspects of the present disclosure.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the Detailed Description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a representative automobile, which is designated generally at 10 and portrayed herein for purposes of discussion as a sedan-style, fuel cell electric vehicle (FCEV). The illustrated automobile 10—also referred to herein as "motor vehicle" or "vehicle" for short—is merely an exemplary application with which novel aspects of this disclosure may be practiced. In the same vein, implementation of the present concepts into a PEM-type fuel cell system should also be appreciated as a representative implementation of the novel concepts disclosed herein. As such, it will be understood that aspects of the present disclosure may be applied to other fuel cell architectures, incorporated into any logically relevant type of vehicle, and utilized for both automotive and non-automotive applications alike. Lastly, only select components have been shown and will be described in additional detail herein. Nevertheless, the vehicles, fuel cell systems, and stack force-mitigating devices discussed below may include numerous additional and alternative features, and other available peripheral components and hardware, for carrying out the various methods and functions of this disclosure.

Packaged within the vehicle body 12 of automobile 10 is a representative fuel cell system 14 for powering one or more traction motors, such as electric motor generator unit (MGU) 16, operable for driving a combination of the vehicle's road wheels 18. Proton exchange membrane fuel cell system 14 of FIG. 1 is equipped with one or more fuel cell stacks 20, each of which is composed of multiple fuel cells 22 of the PEM type that are connected in electrical series or parallel with one another. In the illustrated architecture, each fuel cell 22 is a multi-layer construction with an anode side 24 and a cathode side 26 that are separated by a proton-conductive perfluorosulfonic acid membrane 28. An anode diffusion media layer 30 is provided on the anode side 24 of the PEMFC 22, with an anode catalyst layer 32 interposed between and operatively connecting the membrane 28 and corresponding diffusion media layer 30. Likewise, a cathode diffusion media layer 34 is provided on the cathode side 26 of the PEMFC 22, with a cathode catalyst layer 36 interposed between and operatively connecting the membrane 28 and corresponding diffusion media layer 34. The two catalyst layers 32 and 36 cooperate with the membrane 28 to define, in whole or in part, a membrane electrode assembly (MEA) 38.

The diffusion media layers 30 and 34 are porous constructions that provide for fluid inlet transport to and fluid exhaust transport from the MEA 38. An anode flow field plate (or "first plate") 40 is provided on the anode side 24 in abutting relation to the anode diffusion media layer 30. In the same vein, a cathode flow field plate (or "second plate") 42 is provided on the cathode side 26 in abutting relation to the cathode diffusion media layer 34. Coolant flow channels 44 traverse each of the plates 40 and 42 to allow cooling fluid to flow through the fuel cell 22. Fluid inlet ports and manifolds direct a hydrogen-rich fuel and an oxidizing agent to passages in the anode and cathode flow field plates 40, 42. A central active region of the anode's plate 40 that confronts the proton-conductive membrane 28 may be fabricated with an anode flow field composed of serpentine flow channels for distributing hydrogen over an opposing face of the membrane 28. The MEA 38 and plates 40, 42 may be stacked together between stainless steel clamping plates and monopolar end plates. These clamping plates may be electrically insulated from the end plates by a gasket or dielectric coating. The fuel cell system 14 may also employ anode recirculation where an anode recirculation gas is fed from an exhaust manifold through an anode recirculation line for recycling hydrogen back to the anode side 24 input so as to conserve hydrogen gas in the stack 20.

Hydrogen ($H_2$) inlet flow—be it gaseous, concentrated, entrained, or otherwise—is transmitted from a hydrogen source, such as fuel storage tank 46, to the anode side 24 of the fuel cell stack 20 via a fluid injector 47 coupled to a (first) fluid intake conduit or hose 48. Anode exhaust exits the stack 20 via a (first) fluid exhaust conduit or hose 50. A compressor or pump 52 provides a cathode inlet flow, such as ambient air and/or concentrated gaseous oxygen ($O_2$), via a (second) fluid intake line or manifold 54 to the cathode side 26 of the stack 20. Cathode exhaust is output from the stack 20 via a (second) fluid exhaust conduit or manifold 56. Flow control valves, flow restrictions, filters, and other available devices for regulating fluid flow can be implemented by the PEMFC system 14 of FIG. 1. Electricity generated by the fuel cell stack(s) 20 and output by the fuel cell system 14 may be transmitted for storage to an in-vehicle traction battery pack 82 within a rechargeable energy storage system (RESS) 80.

Fuel cell system 14 of FIG. 1 may also include a thermal sub-system operable for controlling the temperature of the fuel cell stack 20 during preconditioning, break-in, and post-conditioning. According to the illustrated example, a cooling fluid pump 58 pumps a cooling fluid through a coolant loop 60 to the fuel cell stack 20 and into the coolant channels 44 in each cell 22. A radiator 62 and a heater 64 fluidly coupled in the coolant loop 60 are used to maintain the stack 20 at a desired operating temperature. This fuel cell conditioning system may be equipped with various sensing devices for monitoring system operation and progress of fuel cell break-in. For instance, a (first) temperature sensor 66 monitors a temperature value of the coolant at a coolant inlet to the fuel cell stack 20, and a (second) temperature sensor 68 measures a temperature value of the coolant at a coolant outlet of the stack 20. An electrical connector or cable 74 connects the fuel cell stack 20 to an electric power load 76, which may be employed to draw a current from each cell 22 in the stack 20 during cell stack break-in. A voltage/current sensor 70 is operable to measure, monitor or otherwise detect fuel cell voltage and/or current across the fuel cells 22 in the stack 20 during break-in operations.

Programmable electronic control unit (ECU) 72 helps to control operation of the fuel cell system 14. As an example, ECU 72 receives one or more temperature signals T1 from one or more of the temperature sensors 66, 68 that indicate the temperature of the fuel cell stack 20; ECU 72 may be programmed to responsively issue one or more command signals C1 to modulate operation of the stack 20. ECU 72 of FIG. 1 also receives one or more voltage signals V1 from the voltage sensor 70; ECU 72 may be programmed to responsively issue one or more command signals C2 to modulate operation of the hydrogen source 46 and/or compressor/pump 52 to thereby regulate the electrical output of the stack 20. ECU 72 of FIG. 1 is also shown receiving one or more coolant temperature signals T2 from sensor 66 and/or 68; ECU 72 may be programmed to responsively issue one or more command signals C3 to modulate operation of the fuel cell's thermal system. Additional sensor signals SN may be received by, and additional control commands CN may be issued from the ECU 72, e.g., to control any other subsystem or component illustrated and/or described herein. The ECU 72 may emit a command signal to transmit evolved hydrogen and liquid $H_2O$ from the cathode side 26 through fluid exhaust conduit 56 to a water separator 78 (FIG. 1) where hydrogen and water from the cathode are combined with depleted hydrogen exhausted from the anode through fluid exhaust conduit 50. ECU 72 may then command this water separator 78 to separate hydrogen from water and, when desired, recycle the separated hydrogen back to the anode fluid inlet.

With continuing reference to FIG. 1, the traction battery pack 82 contains an array or rechargeable lithium-class (secondary) battery modules 84. Aspects of the disclosed concepts may be similarly applicable to other electric storage unit architectures, including those employing nickel metal hydride (NiMH) batteries, lead acid batteries, lithium metal batteries, or other applicable type of rechargeable electric vehicle battery (EVB). Each battery module 84 may include a series of electrochemical battery cells, such as pouch-type lithium ion (Li-ion) or Li-ion polymer battery cells 86. An individual Li-ion battery module 84, for example, may be typified by a grouping of 10-45 battery cells that are stacked in side-by-side facing relation with one another and connected in parallel or series for storing and supplying electrical energy. While described as a silicon-based, Li-ion "pouch cell" batteries, the cells 86 may be adapted to other constructions, including cylindrical and prismatic constructions.

Figure 2:
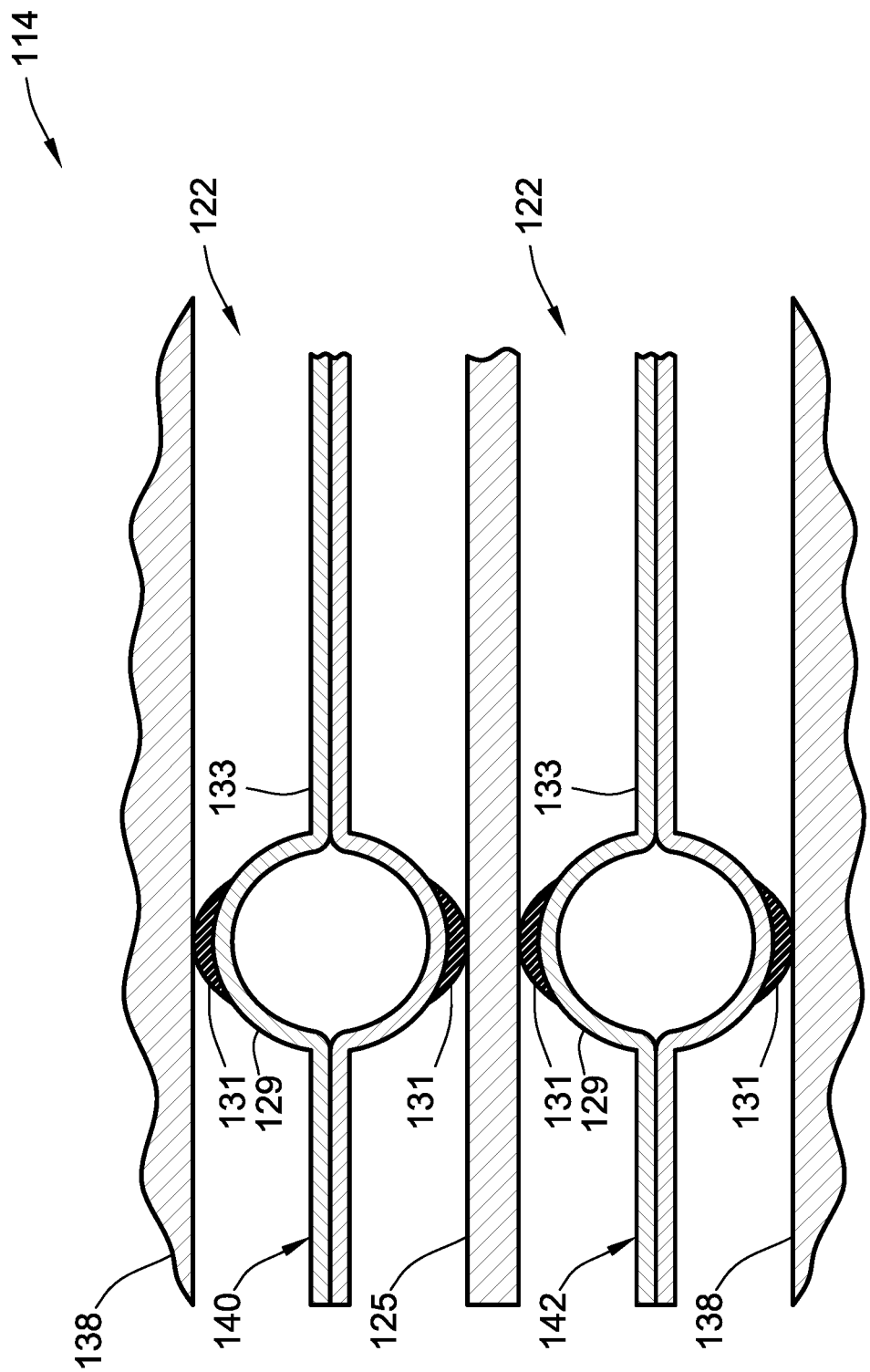
FIG. 2 is an enlarged, cross-sectional side-view illustration of a portion of the fuel cell system of FIG. 1 showing a fuel cell stack with raised bead seals and microseals in accord with aspects of the disclosed concepts.

Turning next to FIG. 2, there is shown an enlarged, cross-sectional view of a select portion of a fuel cell system 114 for converting a hydrogen-rich fuel and an oxidant into electricity through a redox reaction. Although differing in appearance, it is envisioned that any of the features and options described above with reference to the fuel cell system 14 of FIG. 1 may be incorporated, singly or in any combination, into the fuel cell systems 114, 214, 314 and 414 of FIGS. 2-5, and vice versa. As a point of similarity, the fuel cell systems 114, 214, 314 and 414 contain multiple individual fuel cells 122 that are stacked, in face-to-face relation, one on top of the other. Each fuel cell 122 may be substantially identical to one another and may contain those elements illustrated in FIG. 1 and explained above with respect to fuel cell 22. For instance, each individual fuel cell 122 may employ a push plate 138, a pair of flow field plates 140 and 142, and a subgasket 125, which is interposed between and separates the plates 140, 142 of neighboring cells 122.

Each flow field plate 140 may be formed with one or more raised bead seals 129, each of which may extend around an outer periphery of the flow field plate 140 and/or around an interior aperture extending through the respective flow field plate 140. As shown in FIG. 2, each raised bead seal 129 of the fuel cell system 114 is topped with a polymeric microseal 131, which is disposed on opposing outer surfaces of each respective raised bead seal 129. During manufacture of the fuel cell system 114, the flow field plates 140, 142 may be compressed together to deform the raised bead seal 129 and apply a target load to the seal 129 and microseal 131 to ensure proper sealing properties.

During a mechanical shock event on the fuel cell system 114, such as a collision or dropping of the system, the leading cells of the fuel cell stack closest to the applied force may experience a positive g-force that causes an increasing seal force within the flow field plate seals to resist inertial forces applied over the seal areas of the repeating fuel cells in the stack. The seals in the leading fuel cells may inelastically deform and fail due to excessive compression caused by the increased g-force. Conversely, the trailing cells may effectively experience a negative g-force, which causes a decreasing seal force over the seal areas; internal system fluids may leak from the trailing cells due to insufficient sealing forces. In effect, each cell within the stack—depending on its location within the stack—will experience a distinct dynamic load when the stack experiences an applied load from a mechanical shock event.

Fuel cell system modeling and testing has shown that seal force of the flow field plate seals typically decreases over the operational life of the system, e.g., due to seal material creep and material degradation after stack build. As a consequence, seal failure by over-compression at the leading cells in the fuel cell stack may be a primary concern during the early stages of a fuel cell's operational lifetime. On the other hand, at later stages of fuel cell life, insufficient sealing forces at the trailing cells during a collision or other shock event may become a primary concern for system preservation and continued functionality. With this understanding, there are different system needs for mitigating the effects of shock-borne applied forces at the leading cells versus the trailing cells as well as at the different stages of fuel cell operational life.

Presented herein are systems and methods for selectively controlling in-stack seal forces for a fuel cell system, e.g., during a "stacking-direction" shock event, in order to prevent the seal forces from exceeding a predefined maximum seal force limit or falling below a predefined minimum seal force threshold. For an active shock-force mitigation system, a fuel cell system controller or control module may assess the degree of fuel cell stack aging based on a pre-determined relationship between measured stack life and seal creep. Using a suitable sensing device, the active system may detect the occurrence of a mechanical system shock (e.g., collision, jolt, etc.) and concomitantly determines the severity of the event, namely if one of the aforementioned seal force thresholds will likely be reached. If the estimated fuel cell stack aging is at an early stage (e.g., less than about two years in service), the active shock-force mitigation system reduces the shock force applied to the stack by a pre-determined amount for a pre-determined duration. If the estimated fuel cell stack aging is at a later stage of life (e.g., greater than about five years in service), the system increases the stack force by a pre-determined amount for a pre-determined duration. These features may also be used to mitigate the effects of shock forces to prevent damage in the active area of the fuel cell stack.

Figure 3:
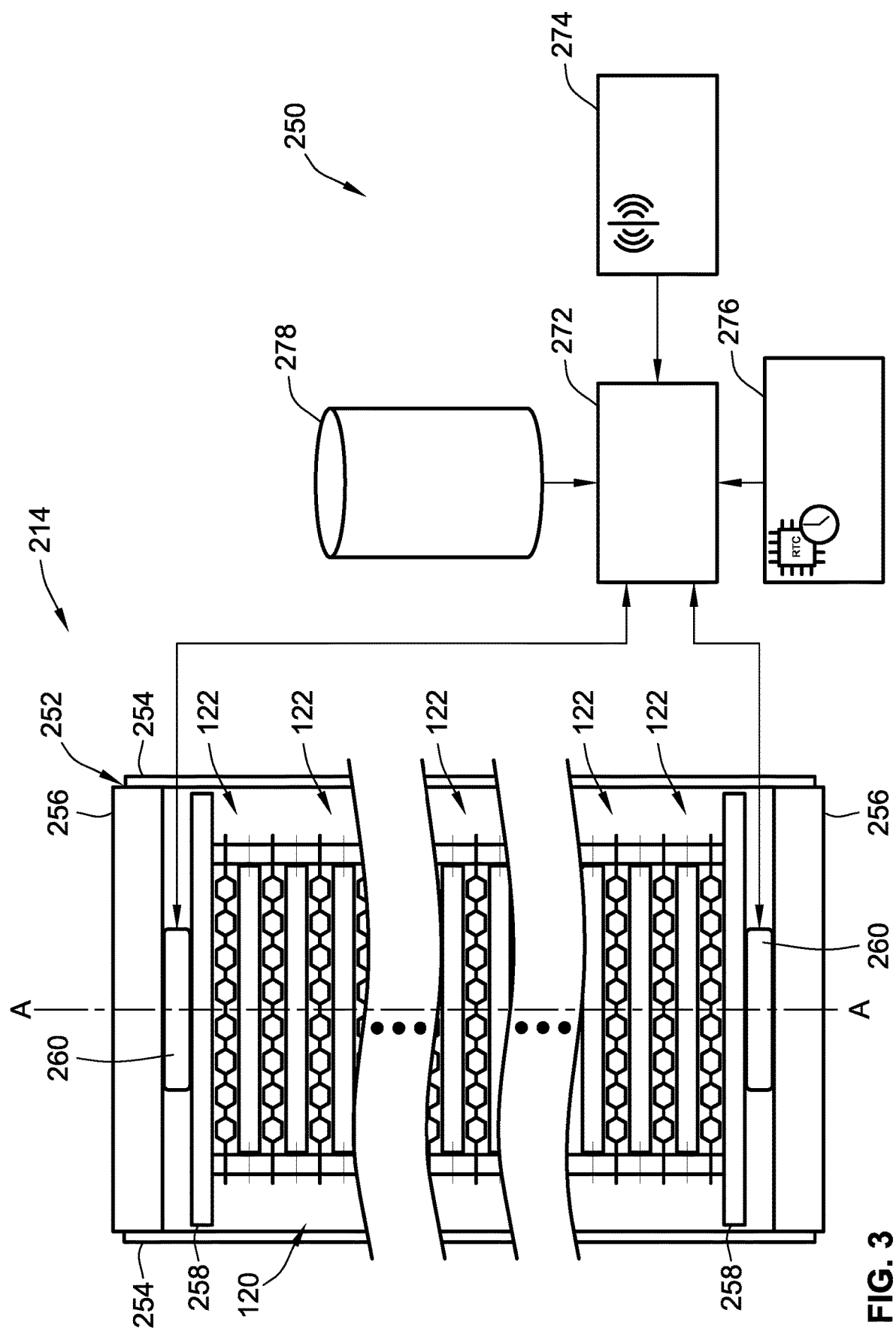
FIG. 3 is a partially schematic, side-view illustration of a representative fuel cell system with a stack of electrochemical fuel cells and a representative active shock-force mitigation system in accord with aspects of the disclosed concepts.

FIG. 3 illustrates a representative fuel cell system 214 with an active shock-force mitigation system 250 for modifying stack forces, such as those resulting from a collision-borne external shock force, imparted to a stack 120 of electrochemical fuel cells 122. Fuel cell system 214 of FIG. 3 is shown with multiple electrochemical fuel cells 122 (e.g., 300-400 or more cells) that are stacked horizontally or vertically, one against the other, along a central stack axis A-A to define a fuel cell stack 120 with a top or left (first) longitudinal end opposite a bottom or right (second) longitudinal end. The fuel cell stack 120 is housed inside a protective outer casing 252 that is fluidly coupled to a hydrogen source and an oxidant source, such as fuel storage tank 46 and air compressor/pump 52 of FIG. 1. The fuel cell's outer casing 252 may be an electrically insulated, hermetically sealed container that is fabricated with one or more lateral sidewalls 254 with a pair of rigid end plates 256 that close off top and bottom open ends of the casing 252. It should be appreciated that the fuel cell system 214 may comprise any number and type of fuel cell designs, which may be packaged inside similar or distinct container configurations from that shown in the drawings.

The shock-force mitigation system 250 is generally composed of a pair of movable push plates 258 located inside of the protective outer casing 252. Each push plate 258 abuts a respective longitudinal end of the fuel cell stack 120 and is free to translate rectilinearly along the stack axis A-A (e.g., up and down in a reciprocating fashion in FIG. 3). Additionally, each push plate 258 is located in facing spaced relation to a respective one of the end plates 256 such that the mutually parallel end plates 256 and push plates 258 are arranged in two discrete plate pairs located at the longitudinal ends of the outer casing 252. The end plates 256 are rigidly mounted to the sidewalls 254 such that the fuel cell stack 120 and adjoining push plates 258 move in unison between the end plates 256.

Interposed within each plate pair, i.e., sandwiched between one end plate 256 and one push plate 258, is a force-modifying device 260 that is selectively operable to reduce and/or increase stack forces imparted to the fuel cell stack 120 as a result of a shock event. In accord with the illustrated example, each force-modifying device 260 is portrayed as a fluidic bladder system, a linear actuator, or other suitable electronic, hydraulic, or pneumatic force-modifying device. In at least one envisioned implementation, the force-modifying devices 260 use electromagnets paired with magnetorheological (MR) fluid within a hydraulic cylinder body of a shock absorber to continually vary force-modifying rates. Triggering changes within the magnetic charges of the electromagnets alters the viscosity and, thus, the force-modifying coefficient of the MR fluid. The force-modifying devices 260 may be configured to impart at least a predetermined force, e.g., of about 3.0-3.5 kN or greater, within a predetermined reaction deploy time, e.g., of about 10-20 ms or less.

With continuing reference to FIG. 3, the active shock-force mitigation system 250 may use closed-loop feedback control to selectively activate and modulate output of the force-modifying devices 260 during a detected shock event. By way of example, and not limitation, an electronic shock sensor 274 monitors the system 250 to detect the onset of a shock event (e.g., elastic or inelastic collision, jolt, etc.) that causes a shock force to be imparted to the fuel cell stack 120. Upon detection of such an event, the electronic shock sensor 274 outputs one or more sensor signals indicative thereof to a resident or remote system controller 272. It is envisioned that the shock sensor 274 may take on a multitude of different configurations, including a pneumatic, hydraulic or capacitive load cell, a bilateral or trilateral capacitive, piezo, or compression accelerometer, a column, shear, or donut force transducer, or other device suitable for sensing a mechanical shock to the fuel cell system 214. Subsequent shock force mitigation processes may be directly responsive to system detection of a shock event that results in an external shock force with an attendant internal stack force imparted to the stack 120.

An electronic real-time clock (RTC) 276 monitors real-time or near real-time operational life ("stack life") of the fuel cell stack 120 and outputs one or more RTC signals indicative thereof to the system controller 272. Upon detection of a mechanical shock to the system 214, the system controller 272 retrieves stack life data from the RTC 276 and concurrently accesses stack aging data stored in a resident or remote memory device 278 or other appropriate non-transitory, computer readable media. This stack aging data associates a sequence of fuel cell stack lives (e.g., in increments of years, months, days, etc., or an accumulated spectrum of prior shock events, fuel cell operations, etc.) with respective levels of seal degradation (e.g., estimated percentage of seal creep, seal tensile strength, seal peel strength, etc.). As the fuel cell system 114 ages, the system seals and other "softgoods" may lose their integrity; by tracking system life and predicting system aging, the shock-force mitigation system 250 is able to tailor its response to the specific age-related needs of the system 214 at the time of given event.

The electronic system controller 272 of FIG. 3, which may be embodied as a discrete controller or a set of microcontrollers or a control module embedded within a central system controller (e.g., ECU 72 of FIG. 1), is communicatively connected to and programmed to control the two force-modifying devices 260. Memory-stored, processor-executable instructions may cause the programmable controller 272 to callup an initialization procedure for a shock force mitigation protocol. This routine may be executed in real-time, near real-time, continuously, systematically, sporadically, and/or at regular intervals, for example, each 10 or 100 milliseconds during normal and ongoing operation of the motor vehicle 10. Upon completion of the control operations associated with the shock force mitigation protocol, the protocol may advance to an END terminal block operation and temporarily terminate or, optionally, may loop back to a START terminal block operation and run in a continuous loop.

During system operation, the system controller 272 may receive a sensor signal from the shock sensor 274 indicating onset of a shock event with a resultant applied force. Upon detection of the shock event, the system controller 272 may responsively estimate a degree of fuel cell stack aging based, at least in part, on the stack life data received from the RTC 276 and the stack aging data stored in memory device 278. For instance, the RTC 276 may indicate that the real-time stack life is 28 months and 14 days. Using one of the memory-stored stack aging lookup tables, the system controller 272 may interpolate between the seal degradation levels for 28 and 29 months to predict the current "age" of the stack (e.g., 18% estimated seal creep). At the same time, the controller 272 may determine if the level of cell stack aging has not exceeded a predefined early-stage threshold (e.g., is less than about 20-30% estimated seal creep) or has exceeded a predefined late-stage threshold (e.g., is greater than about 70-80% estimated seal creep). As an alternative to tracking stack life, the system 250 may monitor cell and/or total stack voltage as a way to derive the symptoms of load loss in an active area. As another option, a displacement transducer may measure a compressed length at the push plate (FIG. 4) for comparison against a calibrated length for as-built clearance to detect load loss.

In addition to tailoring system response to the specific age-related needs of the stack, the shock-force mitigation system 250 is also able to modulate its shock force response to the specific intensity of a given event. For instance, the system controller 272 assesses the severity of a detected shock event and, concomitantly, if the severity of the applied force resulting from the shock event reaches a predefined threshold. A predefined subroutine within the shock-force mitigation protocol implements a system-calibrated algorithm to evaluate, e.g., accelerometer data from a time window associated with an initial part of a detected event to decide if it is an actual collision or some lesser event. An in-stack load sensor may then track the intensity of the resultant shock force imparted to the stack for an actual collision event.

Responsive to the estimated/measured severity of the stack force reaching a predefined threshold, the system controller 272 transmits one or more command signals to the one or both force-modifying device 260 to increase or decrease the stack force based on the estimated degree of fuel cell stack aging and, optionally, the intensity of the stack force. By way of non-limiting example, the force-modifying devices 260 may be operated to diminish the stack force by a predetermined amount for a predetermined duration upon determining that the degree of fuel cell stack aging is less than the predefined early-stage threshold. Conversely, the force-modifying devices 260 may be operated to supplement and, thus, intensify the stack force by another predetermined amount for another predetermined duration upon determining that the degree of fuel cell stack aging is greater than the predefined late-stage threshold. The predetermined amount and duration of the attenuating/supplementing force stack by the shock-force mitigation system 250 may be selectively varied depending on the monitored stack life and the severity of the stack force resulting from the shock event.

Some or all of the operations illustrated in FIG. 3, and described in further detail above, may be representative of an algorithm that corresponds to processor-executable instructions that are stored, for example, in main or auxiliary or remote memory (e.g., memory device 278 of FIG. 2), and executed, for example, by an electronic controller, processing unit, logic circuit, or other module or device or network of modules/devices (e.g., ECU 72 and/or controller 272), to perform any or all of the above and below described functions associated with the disclosed concepts. It should be recognized that the order of execution of the operations may be changed, additional operations may be added, and some of the described operations may be modified, combined, or eliminated.

FIGS. 4 and 5 present representative fuel cell system 314, 414 architectures with other representative active/passive shock-force mitigation systems 350 and 450, respectively. In both of these examples, the shock-force mitigation systems 350, 450 employ multiple biasing members 360, each of which is compressed between an end plate 256 and a push plate 258 of a respective plate pair. These biasing members 360 act as force-mitigating devices for passively modify a stack force imparted to the fuel cells 122 in the stack 120. While shown as compression-type helical springs, the biasing members 360 may take on other configurations, including leaf springs, diaphragms, air cylinders, etc. In addition, each system 350, 450 may employ a single biasing member or three or more biasing members.

As a point of contrast between the illustrated systems, the shock-force mitigation system 350 of FIG. 4 may be a purely passive system that functions without manual input or controller intervention. In this example, a pair of travel limit blocks 372 is located between the end and push plates 256, 258 of each plate pair. A pair of travel limit shoulder features, such as the screw heads of shoulder screws 374, are disposed between the fuel cell stack 120 and each push plate 258. Each shoulder screw 374 passes through an unthreaded through-hole in one of the push plates 258 and threadably mates with an internally threaded blind-hole in one of the end plates 256. The depth to which the shoulder screws 374 are mated may be adjusted, for example, to set a desired travel length as well as to accommodate system-to-system manufacturing tolerances. It should be appreciated that greater or fewer than four travel limit blocks 372 and/or four shoulder screws 374 may be incorporated into any of the herein described shock-force mitigation system architectures. Likewise, the travel blocks 372 and shoulder screws 374 may be replaced with alternative features, such as integrally formed or fixedly mounted protrusions that project from the interior surfaces of the end plates 256 and the casing sidewalls 254, respectively.

When the fuel cell system 314 experiences a shock event, the fuel cell stack 120 and push plates 258 will travel, e.g., as a unitary assembly, towards and away from the end plates 256, limited by the compression and expansion of the biasing members 360. The compression/expansion of the biasing member 360 will progressively dissipate and modify the stack force experienced by the fuel cell stack 120. During such stack movement, the push plates 258 may collide with and press against the travel limit blocks 372; in so doing, the blocks 372 limit the outboard travel length of the push plates 258 along the stack axis A-A. In the same vein, the push plates 258 may collide with and press against the screw heads of the shoulder screws 374; in so doing, the shoulder screws 374 limit the inboard travel length and direction of travel of the push plates 258.

With reference next to FIG. 5, the shock-force mitigation system 450 may be a hybrid active/passive system that offers both passive damping and controller-automated force modification. Similar to the system 350 of FIG. 4, the shock-force mitigation system 450 employs a pair of axially aligned biasing members 360 for passively modifying stack forces imparted to the cells 122 in the stack 120. In this instance, however, a fluid source 472 is operatively connected via fluid conduit 474 to bladders 260 within the fuel cell system casing 252. A fluid injection device 476 controls injection timing and pulse width of fluid from the fluid source 472 into the fuel cell stack 120. In FIG. 5, the fluid source 472 and fluid injection device 476 are portrayed as distinct, dedicated devices employed by the system 450 solely for shock force modification. However, it may be desirable, e.g., for system simplicity and cost, that the fluid source 472 and fluid injection device 476 include the fuel storage tank 46 and injector 47 of FIG. 1, respectively, to minimize any redundancy of parts. Upon detection of a mechanical shock to the fuel cell system 414, the system controller 272 may responsively command the fluid injection device 476 to inject fluid into the fuel cell stack 120 at a predefined pressure for a predefined deploy time.

During dynamic loading of a fuel cell stack, the resultant applied loads to the system's seals ("seal force") may exceed the seals' bond and material strength, which in turn may lead to seal buckling strength or break elongation in the leading cell(s) of a high-load stack (HLS) at a beginning-of-life (BOL) shock event. In addition, negative seal forces in a low-load stack (LLS) during an end-of-life (EOL) shock event may cause temporary leaks and/or permanent damage to the bond strength between the microseals and the metal bead or between elastomeric beads and bipolar plate substrates in the trailing cells. Actively and passively controlling the seal force, as described above, helps to prevent seal structure failure and/or loss of sealing capability during a mechanical shock event of a fuel cell stack with a shock load in the direction of stacking (e.g., along axis A-A).

Stack force control during a BOL shock event may actively/passively reduce seal forces throughout the stack so as to ensure that the leading cells do not reach or exceed the maximum seal force limit. In this instance, the fuel cell system has not yet reached a degree of aging in which the trailing cells will experience a seal force that is sufficient to meet/exceed the maximum seal force limit and the force reduction will not be sufficiently large so as to cause the trailing cells to experience a negative seal force that reaches or falls below the minimum seal force threshold. On the other hand, stack force control during an EOL shock event may actively/passively increase seal forces throughout the stack so as to ensure the trailing cells do not reach or fall below the minimum seal force threshold. In this instance, the fuel cell system has reached a degree of aging in which the trailing cells may experience a negative seal force sufficient to cause the trailing cells to reach the minimum seal force threshold. As a consequence, the system actively/passively increases the seal force on the entire stack in a manner that will sufficiently mitigate the negative seal force without concurrently increasing the positive seal force on the leading cells in a manner that they would reach or exceed the maximum seal force limit. In addition to managing stack loads during a collision or other system shock event, disclosed shock-force mitigation systems may also be available to manage loads during normal system operation.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A fuel cell system, comprising:
a plurality of electrochemical fuel cells stacked face-to-face along a stack axis to define a fuel cell stack with opposing first and second longitudinal ends;
first and second push plates abutting the first and second longitudinal ends, respectively, of the fuel cell stack and movable along the stack axis;
first and second end plates located in facing spaced relation to the first and second push plates, respectively, to define first and second plate pairs;
first and second force-modifying devices interposed within the first and second plate pairs, respectively, and configured to modify a stack force imparted to the fuel cell stack;
a memory device storing stack aging data associating each of a plurality of fuel cell stack lives with a respective one of a plurality of seal creep levels; and
an electronic system controller connected to the memory device and operable to control the first and second force-modifying devices based on the stack aging data.

2. The fuel cell system of claim 1, wherein the first and second force-modifying devices include first and second bladder systems or linear actuators, wherein the electronic system controller is communicatively connected to and operable to control the first and second bladder systems or linear actuators.

3. The fuel cell system of claim 2, further comprising a shock sensor operable to detect onset of a shock event that causes the stack force to be imparted to the fuel cell stack and output a sensor signal indicative thereof to the electronic system controller.

4. The fuel cell system of claim 3, further comprising an electronic real-time clock operable to track a monitored stack life of the fuel cell stack and output a clock signal indicative thereof to the electronic system controller.

5. The fuel cell system of claim 4, wherein the system controller is programmed to:
receive, from the shock sensor, the sensor signal indicating onset of the shock event;
responsive to detection of the shock event, determine an estimated degree of fuel cell stack aging using the monitored stack life and the stack aging data;
determine if a severity of the stack force resulting from the shock event reaches a predefined threshold; and
responsive to the severity of the stack force reaching the predefined threshold, transmit a command signal to the first and second bladder systems or linear actuators to modify the stack force based on the estimated degree of fuel cell stack aging.

6. The fuel cell system of claim 5, wherein the command signal causes the first and second bladder systems or linear actuators to:
decrease the stack force by a first predetermined amount for a first predetermined duration if the degree of fuel cell stack aging is less than a predefined early-stage threshold; and
increase the stack force by a second predetermined amount for a second predetermined duration if the degree of fuel cell stack aging is greater than a predefined late-stage threshold.

7. The fuel cell system of claim 6, wherein the first and second predetermined amounts and the first and second predetermined durations vary depending on the monitored stack life and the severity of the stack force resulting from the shock event.

8. The fuel cell system of claim 1, wherein the first and second force-modifying devices include first and second biasing members each compressed between a respective one of the first and second plate pairs.

9. The fuel cell system of claim 8, further comprising:
a fluid source fluidly connected to the fuel cell stack; and a fluid injection device controlling injection of fluid from the fluid source into the fuel cell stack, wherein the electronic system controller is communicatively connected to the fluid injection device and operable to command injection of the fluid into the fuel cell stack at a predefined pressure for a predefined deploy time in response to detection of a shock event causing the stack force.

10. The fuel cell system of claim 8, further comprising first and second travel limit blocks each located between a respective one of the first and second plate pairs and configured to limit a travel length of the first and second push plates along the stack axis.

11. The fuel cell system of claim 10, further comprising first and second travel limit shoulders disposed between the fuel cell stack and the first and second push plates, respectively, and configured to limit a travel direction of the first and second push plates along the stack axis.

12. An electric-drive vehicle, comprising:
a vehicle body;
a plurality of road wheels attached to the vehicle body;
a traction motor attached to the vehicle body and operable to drive one or more of the road wheels to thereby propel the electric-drive vehicle;
a fuel cell system attached to the vehicle body and operable to power the traction motor, the fuel cell system including:
 a plurality of electrochemical fuel cells stacked face-to-face along a stack axis to define a fuel cell stack with opposing first and second longitudinal ends;
 first and second push plates abutting the first and second longitudinal ends, respectively, of the fuel cell stack and movable along the stack axis;
 first and second end plates located in facing spaced relation to the first and second push plates, respectively, to define first and second plate pairs; and
 first and second force-modifying devices interposed within the first and second plate pairs, respectively, and configured to selectively increase and decrease a stack force imparted to the fuel cell stack;
a memory device storing stack aging data associating a series of fuel cell stack lives each with a respective level of seal creep; and
an electronic system controller connected to the memory device and operable to control the first and second force-modifying devices based on the stack aging data.

13. A method for assembling a fuel cell system, the method comprising:
stacking a plurality of electrochemical fuel cells face-to-face along a stack axis to define a fuel cell stack with opposing first and second longitudinal ends;
abutting first and second push plates against the first and second longitudinal ends, respectively, of the fuel cell stack, such that the first and second push plates are movable along the stack axis;
locating first and second end plates in facing spaced relation to the first and second push plates, respectively, such that the first push plate and the first end plate define a first plate pair and the second push plate and the second end plate define a second plate pair;
interposing a first force-modifying device between the first plate pair and a second force-modifying device between the second plate pair, the first and second force-modifying devices configured to modify a stack force imparted to the fuel cell stack;
connecting an electronic system controller to a memory device storing stack aging data, the stack aging data associating each of a plurality of fuel cell stack lives with a respective one of a plurality of seal creep levels; and
connecting the electronic system controller to the first and second force-modifying devices to control the first and second force-modifying devices based on the stack aging data.

14. The method of claim 13, wherein the first and second force-modifying devices include first and second bladder systems or linear actuators.

15. The method of claim 14, further comprising communicatively connecting a shock sensor to the electronic system controller, the shock sensor being operable to detect the onset of a shock event that causes the stack force and output a sensor signal indicative thereof.

16. The method of claim 15, further comprising communicatively connecting an electronic real-time clock (RTC) to the electronic system controller, the electronic RTC being operable to track a stack life of the fuel cell stack and output a clock signal indicative thereof.

17. The method of claim 13, wherein the first and second force-modifying devices include first and second biasing members compressed between the first and second plate pairs, respectively.

18. The method of claim 17, further comprising:
fluidly connecting a fluid source to the fuel cell stack;
fluidly connecting a fluid injection device to the fluid source, the fluid injection device being operable to control injection of fluid from the fluid source into the fuel cell stack; and
connecting the electronic system controller to the fluid injection device, the electronic system controller being operable to command injection of the fluid into the fuel cell stack at a predefined pressure for a predefined deploy time in response to detection of a shock event causing the stack force.

19. The method of claim 16, wherein the system controller is programmed to:
receive, from the shock sensor, the sensor signal indicating onset of the shock event;
responsive to detection of the shock event, determine an estimated degree of fuel cell stack aging using the monitored stack life tracked by the RTC and the stack aging data stored in the memory device;
determine if a severity of the stack force resulting from the shock event reaches a predefined threshold; and
responsive to the severity of the stack force reaching the predefined threshold, transmit a command signal to the first and second bladder systems or linear actuators to modify the stack force based on the estimated degree of fuel cell stack aging.

20. The method of claim 19, wherein the command signal causes the first and second bladder systems or linear actuators to:
decrease the stack force by a first predetermined amount for a first predetermined duration if the degree of fuel cell stack aging is less than a predefined early-stage threshold; and
increase the stack force by a second predetermined amount for a second predetermined duration if the degree of fuel cell stack aging is greater than a predefined late-stage threshold.

* * * * *